J. C. ANDERSON.
METHOD OF MAKING AUTOMOBILE TIRES.
APPLICATION FILED MAR. 22, 1916.
1,254,015.
Patented Jan. 22, 1918.
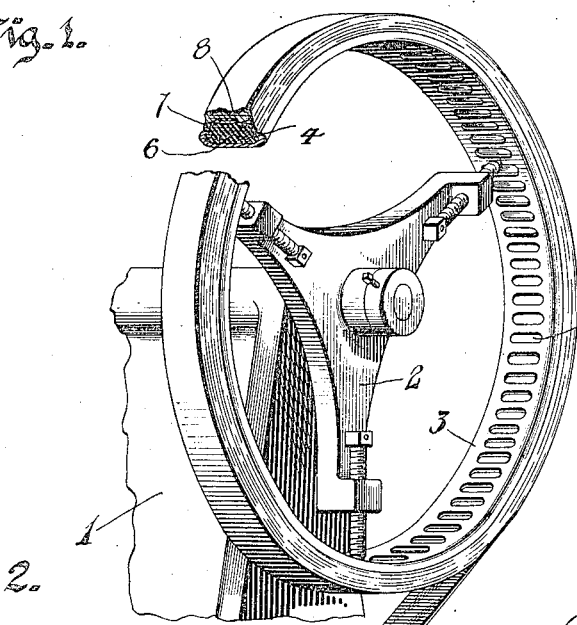
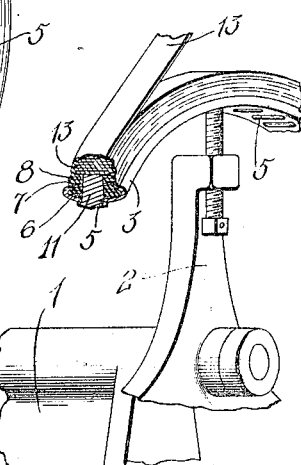
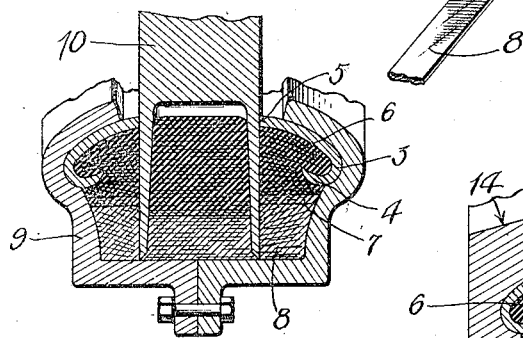
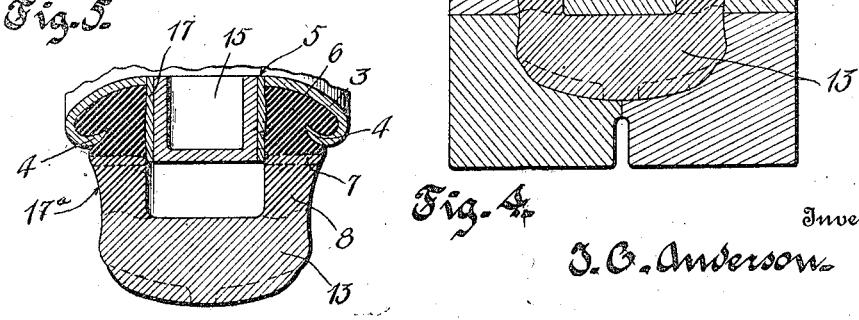
Inventor
J. C. Anderson
By
Attorney

UNITED STATES PATENT OFFICE.

JAMES C. ANDERSON, OF WASHINGTON, DISTRICT OF COLUMBIA.

METHOD OF MAKING AUTOMOBILE-TIRES.

1,254,015.

Specification of Letters Patent. Patented Jan. 22, 1918.

Application filed March 22, 1916. Serial No. 85,845.

*To all whom it may concern:*

Be it known that I, JAMES C. ANDERSON, a citizen of the United States, residing at Washington, in the District of Columbia, have invented certain new and useful Improvements in Methods of Making Automobile-Tires, of which the following is a specification.

This invention relates to improvements in the method of making built up, cellular, automobile tires, of such construction that the walls of the cells will become distorted under load strain to compress the air contained in the cells.

In my application for patent filed concurrently herewith, I have disclosed a tire constructed by the process defined in this application, the claims in this application, however, being limited to the method of making the tires.

In the manufacture of a tire provided with a plurality of individual closed cells containing compressed air, numerous practical difficulties are encountered and must be overcome, and to meet these conditions I have found it necessary to first build up the tire body in a rough state, then cut openings therein to form the cells, and subsequently temporarily plug the openings, and finally, by various steps, vulcanize and shape the tire, and permanently plug the openings to trap and seal the air contained therein, and thereby form a tire having cells, each of which contains compressed air.

Primarily the present invention aims to provide an economical and practical method for manufacturing cellular tires, the cells of which contain compressed air which results from one of the steps involved in the method.

In practice, a suitable base material, such as vulcanizable rubber, or rubber composition in crude form, is spun on a permanent rim, and various strata of rubber, or rubber compositions having resilient characteristics, are spun on the base layer. The rough tire thus far formed is punched at desired intervals to form a plurality of openings to form the foundation for a plurality of cells. Another stratum of crude rubber is spun over the rough body to provide the tread of the tire and to close the outer ends of the openings in the body. The tire body is now placed in a vulcanizing form and vulcanized and shaped, the cells during this step in the method being temporarily plugged to maintain the proper shape and contour of the cellular structure.

After the tire is vulcanized, the temporary plugs are removed, and permanent plugs are substituted, these latter plugs serving as a means for trapping and compressing the air contained in the cells.

Briefly the foregoing are the steps involved in the present method. By employing this method I have found I can economically produce a tire having cells containing compressed air, and that tires can be produced in a comparatively short time, without the employment of skilled artisans.

To illustrate one way of carrying out the process, reference is had to the accompanying drawings wherein:

Figure 1 is a perspective view illustrating conventionally a rotary support and a rim mounted thereon, and a layer of crude rubber being spun on said rim to form the tire base.

Fig. 2 is a conventional illustration of a section of the tie as formed on the support, inclosed in a casing, and illustrating the step of punching openings to form the cells in the tire.

Fig. 3 is a conventional illustration of such a support as shown in Fig. 1, and containing a section of the rim and the tire having formed therein the opening, and also showing the step of adding an additional stratum of crude rubber to form the tread of the tire.

Fig. 4 illustrates the step of vulcanizing the tire after same is removed from the support disclosed in Fig. 3.

Fig. 5 is a sectional view of the vulcanized tire and illustrating a permanent plug in one of the openings for trapping and compressing the air contained therein, and for forming one of the cells.

In the drawing, the numeral 1 indicates a standard, on which is mounted a rotary support 2. Mounted on the rotary support 2, is a rim 3, the ends of the rim being bent inwardly to form flanges 4. The rim 3, is formed with a plurality of openings 5, arranged at regular intervals, and which, when the tire is completed, will register with cells formed in the tire body. Spun on the support 2, is a layer or stratum of crude, vulcanizable rubber 6. This rubber, as stated, is in crude form, and is of such consistency and composition that when it is vulcanized, becomes hard and forms a solid base for the tire body, which is gripped by the flanges 4, and is confined thereby.

After the base is built up sufficiently, a second and much thinner stratum of crude, vulcanizable rubber, indicated at 7, is spun on the base material, the constituency of this material and the composition thereof being such that it is somewhat resilient, and will adhere to the base layer during a future vulcanizing step.

Over this thin layer of rubber is spun an intermediate layer of crude, vulcanizable rubber, indicated at 8, this layer of rubber being more resilient than the layer 7, and is much thicker and adheres to said layer 7, in the vulcanizing process. The layer 8, forms the intermediate portion of the body of the tire, and in same is formed a plurality of openings 2. After the layer 8, is sufficiently built up, the rough tire body is removed from the support and is confined in a suitable casing or the like 9, and by means of a punch, such, for instance, as indicated at 10, passes through the opening 5, in the rim. Openings are formed in the rough body opposite openings 5, and register therewith. The punch is driven through opening 5, and the rubber is cut out in a solid block, and upon withdrawal of the punch, the block of rubber is withdrawn, leaving an opening corresponding to the opening in the rim. Of course, if desirable, an opening may be provided in the casing, and a solid punch employed to form the openings, in which case the block would be forced out at the time of punching. This step is continued entirely around the tire, thus forming a plurality of spaced openings in the crude body, said openings extending entirely through the tire body as made up to this point.

After the openings are thus formed, filling blocks 11, are temporarily inserted in the openings, then the tire thus far formed is mounted on the rotary support, and another layer of crude, vulcanizable rubber, indicated at 13, is spun over the layer 8. The rubber 13 is less resilient than the layer 8, and is eventually vulcanized to the latter. The layer 13, covers the outer ends of the openings, and forms one wall of each of the cells, as will be hereinafter described.

Up to this time the tire body is roughly formed on the rim, and while the temporary plugs are still in the openings, the rim and the body as a unit is removed to a vulcanizer, conventionally indicated at 14. During the vulcanizing process the various layers of crude rubber are vulcanized to each other with the result that a substantially solid body structure is produced, save for the openings, the body being practically integral with the rim. The constituent parts of the rubber are such that while after the vulcanizing process, each layer save the base layer has a different degree of resiliency than the neighboring layer, yet all said layers form a homogeneous mass vulcanized to the base and practically integral with the rim.

After the rubber is cured by the vulcanizing process, the plugs 11 are removed, and in lieu thereof, permanent plugs 15, are inserted in the openings The plugs 15, may be metal and hollow, or they may be vulcanized rubber blocks of substantially the same material as the base layer of the tire. In either case the plugs are coated with a thin layer of soft rubber 17, and vulcanized, and then treated by what is known as the cold process, and when inserted in the respective openings, the thin coating of rubber forms a binder between the plugs and the base, and effectually seals the respective openings, and thus traps the air contained therein, and at the same time forms a plurality of closed cells.

When the plugs are driven into the openings, the compression of the air can be determined by the speed with which the plugs are inserted in the openings, the thin layer of rubber surrounding the plugs preventing the escape of air.

The treatment of the thin layer of rubber surrounding the plugs is such that effectual adhesion between the plug and the base takes place, and in time the thin rubber forms practically an integral part of the base, and when a vulcanized block is used, the whole base is substantially solid and hard, save for the thin layer of rubber. Either the employment of a hollow or hard rubber plug produces a rigid base for the tire body, and at the same time forms an effectual means for forming the cells, which, so far as I am aware, is new in this art.

The method described produces an economical method of manufacture of tires containing closed cells, in which compressed air is confined, the plugs serving the purpose of sealing the cells, and also serving as a means for determining the pressure of the air in said cells.

In the formation of the tire, the side walls thereof are concaved inwardly, as shown at 17ª in Fig. 5, so that when load pressure is applied to the tire, the said side walls will be distorted inwardly and upwardly toward the rim, which results in the distortion of the walls of the cells, this action further compressing the air contained in said cells for the purposes described in my co-pending application for patent, hereinbefore mentioned.

What I claim is:—

1. The herein described method of making tires consisting in roughly forming a body portion of vulcanizable material, then forming a plurality of openings in said roughly formed body portion, temporarily plugging the openings, vulcanizing the tire with the temporary plugs in the openings, removing the plugs after vulcanizing, and finally permanently plugging the openings to form closed cells and trap the air therein.

2. The herein described method of making tires, consisting in roughly forming a body portion of vulcanizable material, then forming openings in said body portion, and supplying an additional layer of vulcanizable material over the previously roughly formed tire body portion, vulcanizing and shaping the tire, and finally plugging the openings to form closed cells in said tire.

3. The herein described method of making tires consisting in roughly forming a base of vulcanizable material on a rim, subsequently building a body of strata of resilient vulcanizable material on the base material, then forming a plurality of openings in the base and body portion of the roughly formed tire, vulcanizing the tire and making the opposite sides thereof concave, and finally plugging the openings with permanent inserts to form individual closed cells to trap the air contained therein.

4. The herein described method of making tires consisting in forming a layer of material which, when vulcanized, is hard, on a permanent perforated rim, applying several layers of vulcanizable resilient material to the first mentioned layer of material and forming a plurality of openings therein through and corresponding with the perforations in the rim, temporarily plugging the tire body, removing the temporary plug, and finally permanently plugging the openings to seal same and compress and trap the air contained therein.

5. The herein described method of making a cellular tire body consisting in forming a base, forming a rough tire body of vulcanizable material on the base, forming a plurality of openings in the rough resilient tire body, temporarily plugging the openings and vulcanizing the tire body, removing the temporary plugs, and finally permanently plugging the openings to form closed individual cells and trapping and compressing air contained therein.

6. The herein described method of making cellular tires consisting in mounting a perforated rim forming a permanent part of the tire on a support and spinning a base layer of vulcanizable rubber on said rim, said rubber when vulcanized becoming hard and adhering to the rim, placing a thin layer of crude rubber on the base layer, placing a thick layer of rubber of such consistency as to render it more resilient than the thin layer on which it is placed, subsequently confining the rough tire and forming openings in registry with the perforations in the rim through the body thus formed, then placing on the rough body an outer layer of crude rubber less resilient than the previous layer, vulcanizing the body and shaping same, and finally plugging the openings to seal and trap air in the same.

7. The method of making tires consisting in building a rough body of varying strata of crude rubber on a permanent rim having openings, forming openings in the body to register with the openings in the rim, vulcanizing and shaping the body of rubber while contained on said rim to fasten the former to the latter, and finally plugging the openings to seal and trap the air contained therein to provide a plurality of closed compressed air cells.

8. The method of making tires consisting in forming a tire body having an intermediate resilient portion, and providing same with cells, vulcanizing the tire, and finally compressing the air in the cells and sealing the latter by inserting elongated plugs in said cells.

9. The method of making cellular tires consisting in roughly forming a tire body and forming therein a plurality of cells, vulcanizing the rough tire body, and finally compressing the air in the cells and sealing the latter by inserting the plugs.

10. The method of making cellular tires consisting in winding a band of rubber on a base to form a rough tire body and providing openings at intervals, winding other rubber on the rough tire body to close the openings, temporarily plugging the openings and vulcanizing the tire body, removing the temporary plugs, and finally inserting permanent plugs of less depth than the openings to trap air and seal the openings and form closed air cells in the tire body.

11. The method of making tires consisting in winding crude rubber on a permanent rim having openings, winding other crude rubber on the first mentioned rubber to form a part of a rough tire body, then forming openings in the partly formed rough body corresponding to the openings in the rim, temporarily plugging the openings, vulcanizing the rough tire body, and finally removing the temporary plugs and inserting permanent plugs of less depth than the openings to form closed air cells containing compressed air.

12. The herein described method of making tires consisting in roughly forming a body portion of vulcanized material with a plurality of openings, temporarily plugging the openings and vulcanizing the tire body, and finally removing the temporary plugs and inserting plugs of less depth than the openings to form individual closed cells containing compressed air.

13. The herein described method of making tires consisting in roughly forming a tire body portion of varying strata of vulcanizable rubber formed with radial openings, inserting temporary plugs in the openings and then vulcanizing the tire body, removing the temporary plugs and inserting permanent plugs of less depth than the openings to form a series of cells containing air.

In testimony whereof I affix my signature.

JAMES C. ANDERSON.